(12) United States Patent
Nakashima

(10) Patent No.: US 10,114,648 B2
(45) Date of Patent: Oct. 30, 2018

(54) COMPILE METHOD, NON-TRANSITORY COMPUTER-READABLE RECORDING MEDIUM STORING COMPILE PROGRAM, AND INFORMATION PROCESSING DEVICE

(71) Applicant: FUJITSU LIMITED, Kawasaki-shi, Kanagawa (JP)

(72) Inventor: Shusaku Nakashima, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/447,540

(22) Filed: Mar. 2, 2017

(65) Prior Publication Data
US 2017/0300324 A1 Oct. 19, 2017

(30) Foreign Application Priority Data
Apr. 15, 2016 (JP) ................................ 2016-081847

(51) Int. Cl.
G06F 9/30 (2018.01)
G06F 9/38 (2018.01)
G06F 9/50 (2006.01)
G06F 8/41 (2018.01)

(52) U.S. Cl.
CPC .............. *G06F 9/3013* (2013.01); *G06F 8/41* (2013.01); *G06F 9/3887* (2013.01); *G06F 9/50* (2013.01)

(58) Field of Classification Search
CPC ........ G06F 9/3013; G06F 9/50; G06F 9/3887; G06F 8/41
USPC ........................................................ 717/151
See application file for complete search history.

(56) References Cited

U.S. PATENT DOCUMENTS

| | | | | | |
|---|---|---|---|---|---|
| 5,437,045 | A | * | 7/1995 | Davies | G06F 15/8015 345/505 |
| 5,450,603 | A | * | 9/1995 | Davies | G06F 15/17368 700/4 |
| 5,758,176 | A | * | 5/1998 | Agarwal | G06F 9/3001 712/209 |
| 5,887,183 | A | * | 3/1999 | Agarwal | G06F 9/30043 712/17 |
| 5,890,222 | A | * | 3/1999 | Agarwal | G06F 9/30098 711/145 |
| 6,131,188 | A | * | 10/2000 | Goebel | G06F 8/443 712/228 |

(Continued)

FOREIGN PATENT DOCUMENTS

| | | |
|---|---|---|
| JP | 10-293691 | 11/1998 |
| JP | 2008-9957 | 1/2008 |

OTHER PUBLICATIONS

Choi et al., "Optimal Register Reassignment for Register Stack Overflow Minimization", ACM, Mar. 2006, 25pg. (Year: 2006).*

(Continued)

*Primary Examiner* — Ryan D. Coyer
(74) *Attorney, Agent, or Firm* — Oblon, McClelland, Maier & Neustadt, L.L.P.

(57) ABSTRACT

An information processing device includes: a memory that stores a program; and a processor that executes the program to perform operations, wherein the operations includes: specifying a first register which is allocated to scalar data and satisfies a condition that a survival interval of the scalar data includes a survival interval of first data to which any register is not allocated; and allocating an empty area of the first register to the first data.

9 Claims, 19 Drawing Sheets

(56) References Cited

U.S. PATENT DOCUMENTS

| | | | |
|---|---|---|---|
| 6,839,828 B2* | 1/2005 | Gschwind | G06F 9/30043 |
| | | | 712/20 |
| 2004/0054878 A1* | 3/2004 | Debes | G06F 9/30014 |
| | | | 712/221 |
| 2008/0005722 A1 | 1/2008 | Matsuzaki | |
| 2010/0169610 A1* | 7/2010 | Fukai | G06F 9/3826 |
| | | | 712/200 |
| 2016/0132302 A1* | 5/2016 | Gschwind | G06F 3/0604 |
| | | | 717/140 |

OTHER PUBLICATIONS

Yang et al., "Inter-Procedural Stacked Register Allocation for Itanium Like Architecture", ACM, Jun. 2003, 11pg. (Year: 2003).*

* cited by examiner

FIG. 4A

| DATA TYPE | LIVE RANGE | REGISTER | TURN |
|---|---|---|---|
| Simd | 2-5 | | |
| Scalar | 10-15 | | |
| ⋮ | ⋮ | ⋮ | ⋮ |

FIG. 4B

| REGISTER | LIVE RANGE | USE |
|---|---|---|
| %f2 | 1-8 | |
| %f4 | 2-7 | |
| %f6 | 9-17 | |
| ⋮ | ⋮ | ⋮ |

FIG. 11

| | | | | |
|---|---|---|---|---|
| %f0 | SIMD | | | |
| %f1 | SIMD | | | |
| %f2 | SCALAR | | FIRST HALF PART OF SIMD | |
| %f3 | SIMD | | | |
| %f4 | SCALAR | | SECOND HALF PART OF SIMD | |
| %f5 | SIMD | | | |
| %f6 | SCALAR | | | |
| %f7 | SCALAR | | | |
| ⋮ | | | | |
| %f255 | SIMD | | | |

FIG. 12A

| DATA TYPE | LIVE RANGE | REGISTER | TURN |
|---|---|---|---|
| Simd | 2-5 | %f2,%f4 | 1,2 |
| Scalar | 10-15 | | |
| ⋮ | ⋮ | ⋮ | ⋮ |

FIG. 12B

| REGISTER | LIVE RANGE | USE |
|---|---|---|
| %f2 | 1-8 | Simd |
| %f4 | 2-7 | Simd |
| %f6 | 9-17 | |
| ⋮ | ⋮ | ⋮ |

FIG. 16A

| DATA TYPE | LIVE RANGE | REGISTER | TURN |
|---|---|---|---|
| Simd | 2-5 | %f2,%f4 | 1,2 |
| Scalar | 10-15 | %f6 | - |
| ⋮ | ⋮ | ⋮ | ⋮ |

FIG. 16B

| REGISTER | LIVE RANGE | USE |
|---|---|---|
| %f2 | 1-8 | Simd |
| %f4 | 2-7 | Simd |
| %f6 | 9-17 | Scalar |
| ⋮ | ⋮ | ⋮ |

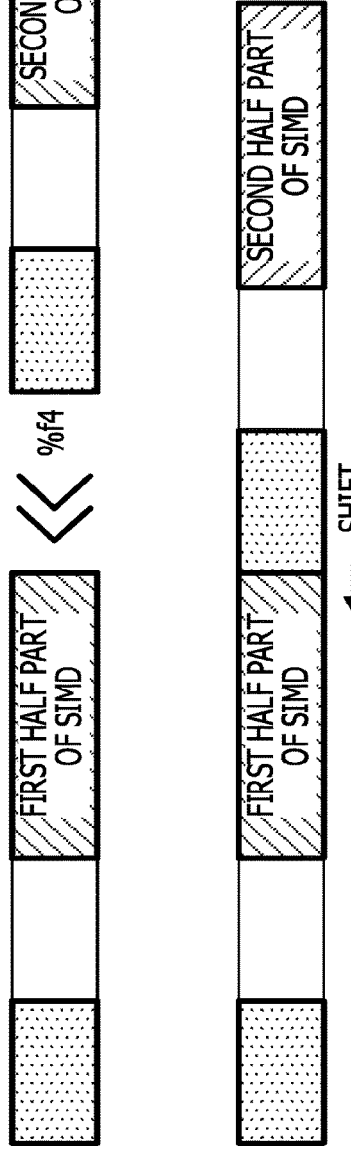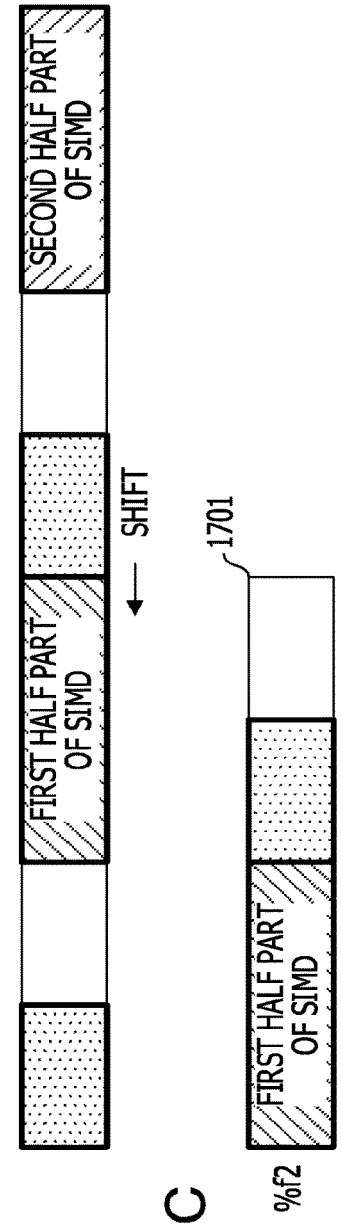
FIG. 17A
FIG. 17B
FIG. 17C

COMPILE METHOD, NON-TRANSITORY COMPUTER-READABLE RECORDING MEDIUM STORING COMPILE PROGRAM, AND INFORMATION PROCESSING DEVICE

CROSS-REFERENCE TO RELATED APPLICATION

This application is based upon and claims the benefit of priority of the prior Japanese Patent Application No. 2016-081847, filed on Apr. 15, 2016, the entire contents of which are incorporated herein by reference.

FIELD

The embodiments discussed herein are related to a compile technology.

BACKGROUND

In translating a source code into an object code, an optimization called a register allocation is performed. Since the register resources of a processor are limited in general, there is a case in which data (for example, data of variables) to which a register may not be allocated is generated in allocating the register. Such a phenomenon is called a register overflow. When the register overflow occurs, the data is temporarily retreated to a memory, and the like. The retreated data is restored to the register when the register is back to usable.

Related technologies are disclosed in, for example, Japanese Laid-Open Patent Publication Nos. 2008-009957 and 10-293691.

SUMMARY

According to one aspect of the embodiments, an information processing device includes: a memory that stores a program; and a processor that executes the program to perform operations, wherein the operations includes: specifying a first register which is allocated to scalar data and satisfies a condition that a survival interval of the scalar data includes a survival interval of first data to which any register is not allocated; and allocating an empty area of the first register to the first data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of data stored in a first data storing unit;
FIG. 4B is a diagram illustrating an example of data stored in a second data storing unit;
FIG. 11 is a diagram illustrating allocation of the SIMD registers for the first half part and the second half part of the SIMD data;
FIG. 12A is a diagram illustrating an example of data stored in the first data storing unit;
FIG. 12B is a diagram illustrating an example of data stored in the second data storing unit;
FIG. 16A is a diagram illustrating an example of the data stored in the first data storing unit;
FIG. 16B is a diagram illustrating an example of the data stored in the second data storing unit;
FIGS. 17A to 17C are diagrams for describing a method for restoring original SIMD data from the first half part and the second half part of the SIMD data.

DESCRIPTION OF EMBODIMENTS

Since a load command and a store command are issued in retreating and restoring, an execution performance of a source code is deteriorated. When the register resources of a processor increases, the occurrence of register overflow may be suppressed. For example, when the register resources increases, a command set architecture is significantly changed, and as a result, it may be difficult to increase the register resources.

Figure 1:
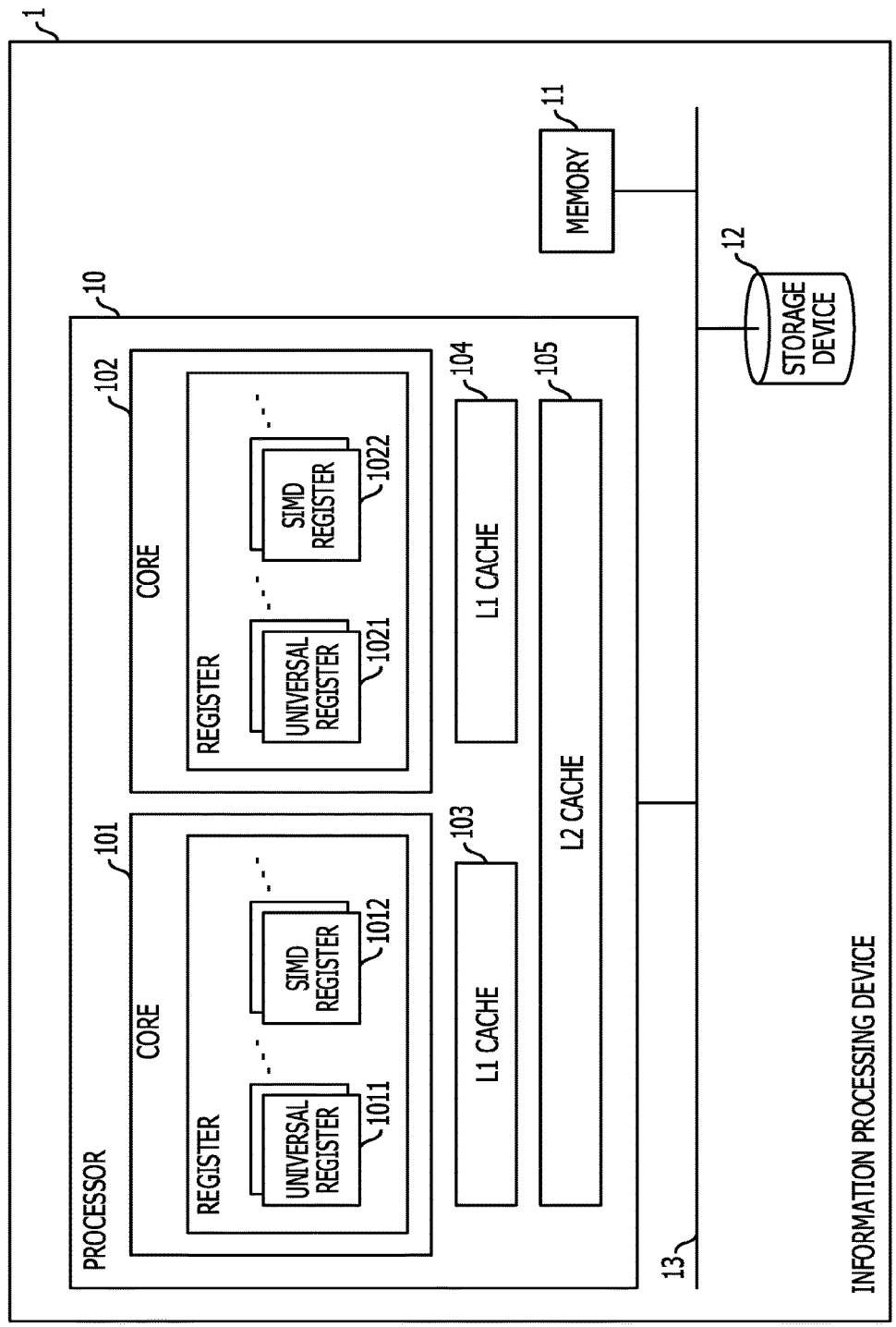
FIG. 1 is a hardware configuration diagram of an information processing device.

FIG. 1 is a hardware configuration diagram of an information processing device 1 according to an embodiment. The information processing device 1 includes a processor 10, a memory 11, a storage device 12, and a bus 13. The processor 10, the memory 11, and the storage device 12 are coupled to each other by the bus 13. The processor 10 is, for example, a central processing unit (CPU). The memory 11 is, for example, a dynamic random access memory (DRAM). The storage device 12 is, for example, a hard disk drive (HDD).

The processor 10 includes cores 101 and 102, Level (L) 1 caches 103 and 104, and an Level (L) 2 cache 105. The core 101 has a register including one or a plurality of universal registers 1011 and one or a plurality of SIMD registers 1012. The core 102 has a register including one or a plurality of universal registers 1021 and one or a plurality of SIMD registers 1022. Meanwhile, in FIG. 1, the number of cores of the processor 10 is 2, but is not limited thereto.

Further, as the register other than the SIMD register, a register other than the universal register may be additionally included.

Figure 2:
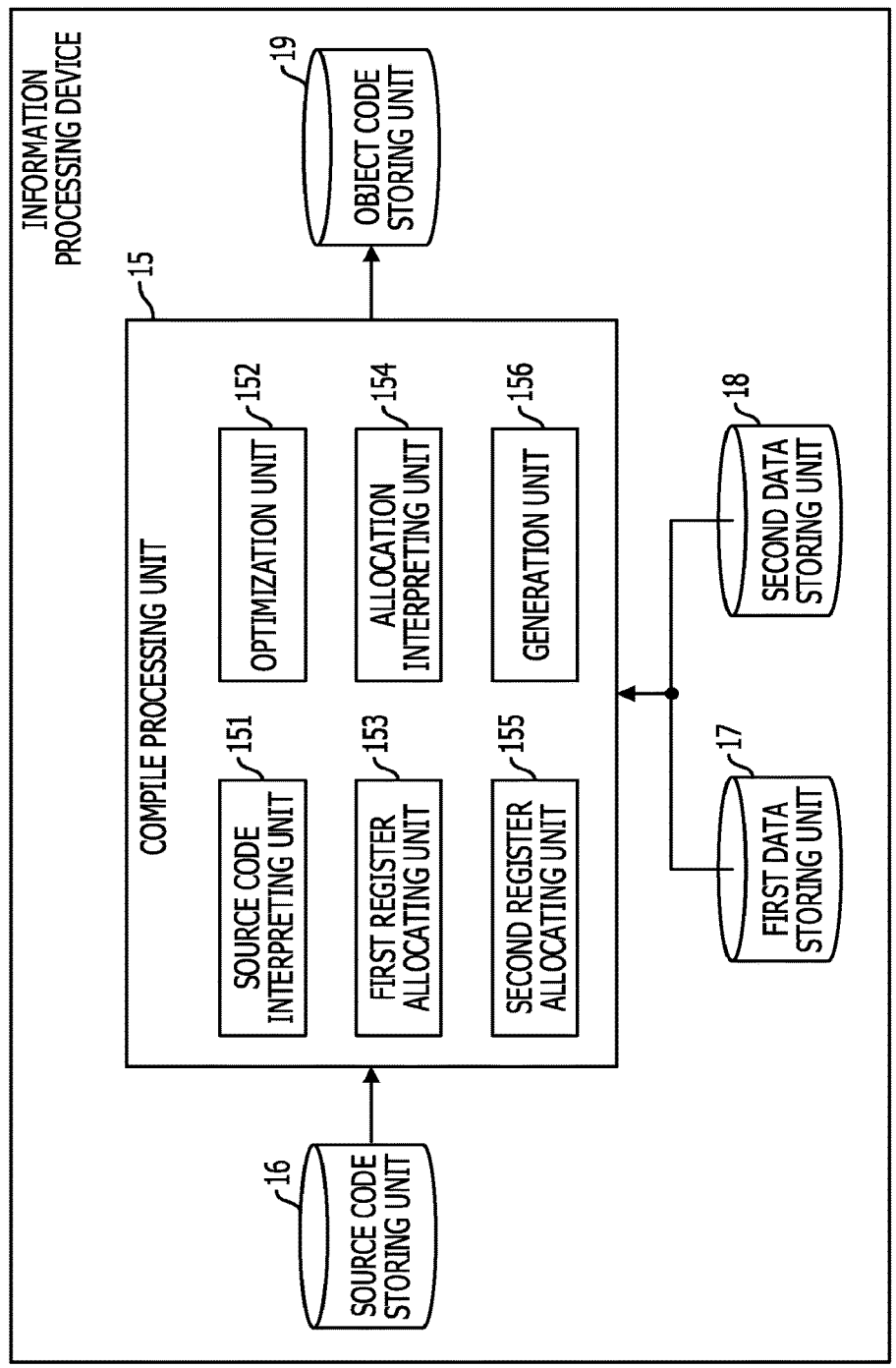
FIG. 2 is a functional block diagram of the information processing device.

A program for executing processing of the embodiment is, for example, stored in the storage device 12 and executed by the processor 10 to realize a function of a compile processing unit 15 illustrated in FIG. 2. FIG. 2 illustrates a functional block diagram of the information processing device 1. The information processing device 1 includes the compile processing unit 15, a source code storing unit 16, a first data storing unit 17, a second data storing unit 18, and an object code storing unit 19. The source code storing unit 16, the first data storing unit 17, the second data storing unit 18, and the object code storing unit 19 are provided in, for example, the storage device 12.

The compile processing unit 15 includes a source code interpreting unit 151, an optimization unit 152, a first register allocating unit 153, an allocation interpreting unit 154, a second register allocating unit 155, and a generation unit 156.

The source code interpreting unit 151 executes lexical analysis, syntax analysis and the like for a source code stored in the source code storing unit 16 to output an execution result to the optimization unit 152. The lexical analysis and the syntax analysis may be known. The optimization unit 152 executes an optimization processing which does not depend on an architecture and a translation processing into an architecture command based on an execution result acquired from the source code interpreting unit 151 and outputs an execution result of the optimization unit 152 to the first register allocating unit 153. The first register allocating unit 153 executes register allocation by a method such as a coloring method based on the execution result acquired from the optimization unit 152 to output a result of the register allocation to the allocation interpreting unit 154. The method may be known. The allocation interpreting unit 154 generates information on register overflow and information on an empty area of an SIMD register from the result acquired from the first register allocating unit 153 to store the information on the register overflow in the first data storing unit 17 and store the information on the empty area of the SIMD register in the second data storing unit 18. The second register allocating unit 155 executes processing by using data stored in the first data storing unit 17 and data stored in the second data storing unit 18 and updates the data stored in the first data storing unit 17 and the data stored in the second data storing unit 18 based on a processing result. The generation unit 156 generates an object code by using the data stored in the first data storing unit 17 and the data stored in the second data storing unit 18 based on an allocation result by the first register allocating unit 153 and stores the generated object code in the object code storing unit 19.

For example, the processing by the source code interpreting unit 151, the processing by the optimization unit 152, the processing by the first register allocating unit 153, and the processing by the generation unit 156 may be a well-known processing.

Figure 3:
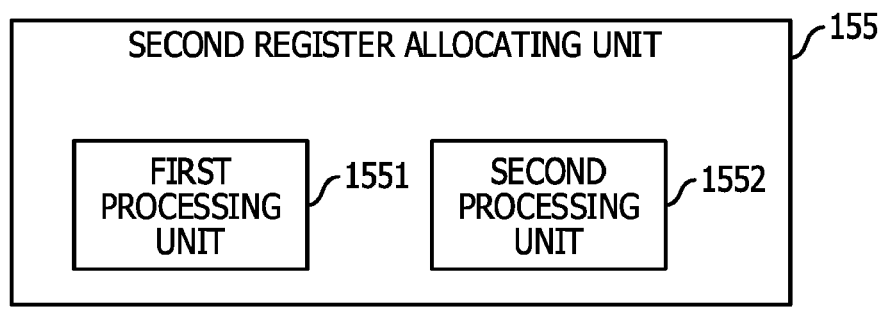
FIG. 3 is a functional block diagram of a second register allocating unit.

FIG. 3 illustrates a function block diagram of the second register allocating unit 155. The second register allocating unit 155 includes a first processing unit 1551 and a second processing unit 1552.

The first processing unit 1551 executes a first optimization processing regarding the register allocation. The second processing unit 1552 executes a second optimization processing regarding the register allocation.

Hereinafter, the register allocation executed when the source code stored in the source code storing unit 16 is translated into the object code will be described. It is assumed that the information on the register overflow is stored in the first data storing unit 17, and further, the information on the empty area of the SIMD register is stored in the second data storing unit 18, as a result of the processing by the allocation analysis unit 154.

FIG. 4A illustrates an example of the information on the register overflow stored in the first data storing unit 17. In the example of FIG. 4A, the information on the register overflow includes a data type, information indicating a live range (also called a survival interval), identification information of an allocated register, and a turn. The data type indicates a type (SIMD or scalar in the embodiment) of data to which a register is not allocated by the processing by the first register allocating unit 153. The live range is the live range of the data. The turn is a number allocated to each data block after dividing in the case of dividing data (hereinafter, called SIMD data. The SIMD data is used in an SIMD operation) in which the data type is the "SIMD." For example, when the SIMD data is divided into two, the turn of the data block of the first half part is 1 and the turn of the data block of the second half part is 2. Meanwhile, in a step before the processing by the second register allocating unit 155 is executed, the identification information and the turn of the allocated register are not stored.

FIG. 4B illustrates an example of the information on the empty area of the SIMD register stored in the second data storing unit 18. In the example of FIG. 4B, the information on the empty area of the SIMD register includes the identification information of the register, information indicating a live range of scalar data (for examples, data used in a scalar operation) stored in the register, and a data type of additionally stored data. In the embodiment, each SIMD register has 4 areas, and one area is used by the scalar data. Accordingly, the register registered in the second data storing unit 18 has 3 empty areas in a step before data is additionally stored. Meanwhile, in the step before the processing by the second register allocating unit 155 is executed, a data type of the data to be additionally stored is not stored.

Hereinafter, the processing executed by the second register allocating unit 155 will be described by using FIGS. 5 to 19B.

Figure 5:
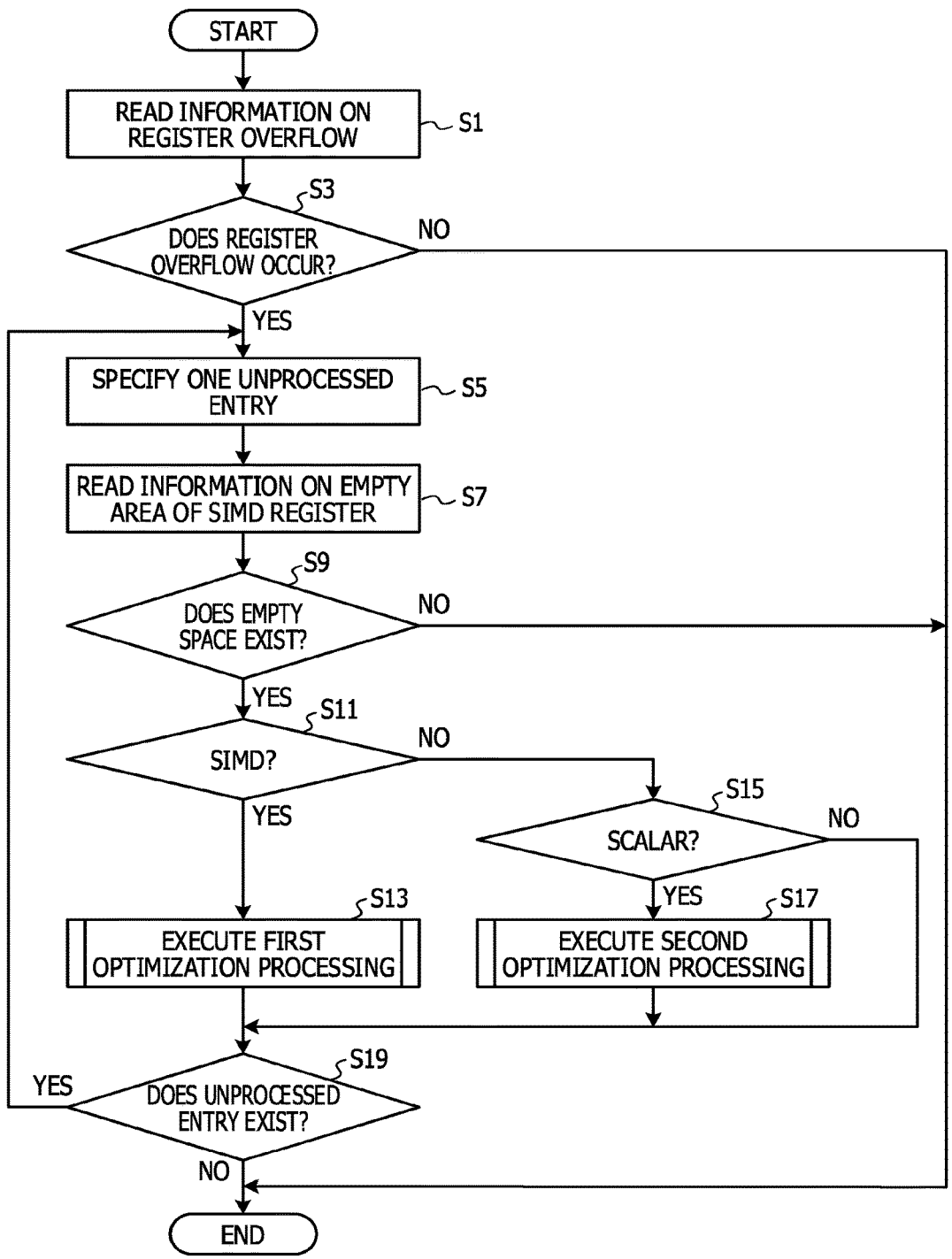
FIG. 5 is a diagram illustrating a main processing flow.

First, the second register allocating unit 155 reads the information on the register overflow from the first data storing unit 17 (FIG. 5: step S1).

The second register allocating unit 155 determines whether the register overflow occurs based on the information read from the first data storing unit 17 (step S3). When it is determined that the register overflow does not occur (step S3: No route), since the register allocation by the second register allocating unit 155 need not be performed, the processing ends.

Meanwhile, when it is determined that the register overflow occurs (step S3: Yes route), the second register allocating unit 155 specifies one unprocessed entry among entries included in the information read from the first data storing unit 17 (step S5).

The second register allocating unit 155 reads the information on the empty area of the SIMD register from the second data storing unit 18 (step S7).

The second register allocating unit 155 determines whether an empty space exists in an area of the SIMD register based on the information read from the second data storing unit 18 (step S9). As described above, the register registered in the second data storing unit 18 has 3 empty areas in the step before data is additionally stored. In the embodiment, the SIMD data is divided into two, and the data blocks after the division uses two areas, respectively, and the scalar data uses one area. Then, allocation is performed such that among the 3 empty areas, two areas are used for the data blocks originated from the SIMD data, and one area is used for the scalar data. Accordingly, the register registered in the second data storing unit 18 has the empty areas as long as both the data blocks originated from the SIMD data and the scalar data are not additionally stored.

When it is determined that no empty space exists in the area of the SIMD register (step S9: No route), the register may not be allocated, even by the processing by the second register allocating unit 155, to data in which the register is not allocated by the processing by the first register allocating unit 153. Accordingly, the processing ends.

Meanwhile, when it is determined that an empty space exists in the area of the SIMD register (step S9: Yes route), the second register allocating unit 155 determines whether the data type included in the entry specified in step S5 is the "SIMD" (step S11).

When it is determined that the data type is the "SIMD" (step S11, Yes route), the second register allocating unit 155 calls the first processing unit 1551 to cause the first processing unit 1551 to execute the first optimization processing (step S13). The first optimization processing will be described by using FIGS. 6 to 12B.

Figure 6:
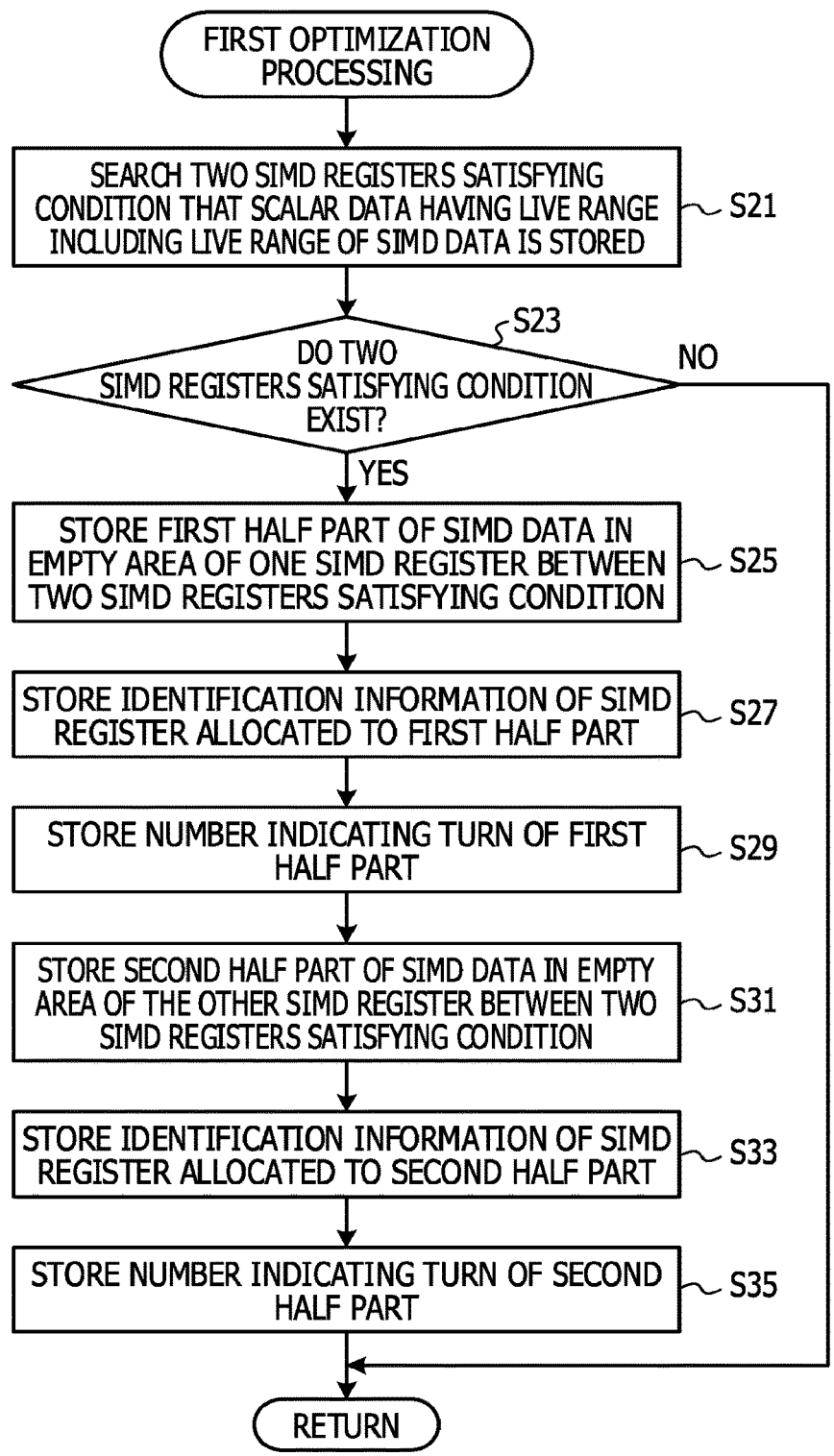
FIG. 6 is a diagram illustrating a processing flow of a first optimization processing.

First, the first processing unit 1551 specifies a live range of the SIMD data (hereinafter, referred to as the "SIMD data to be processed") of the entry specified in step S5 from the information on the register overflow. Then, the first processing unit 1551 searches two SIMD registers satisfying a condition that the scalar data having a live range including the specific live range is to be stored, in the information on the empty area of the SIMD register (FIG. 6, step S21).

Figure 7:
FIG. 7 is a diagram for describing division of SIMD data.
Figure 8:
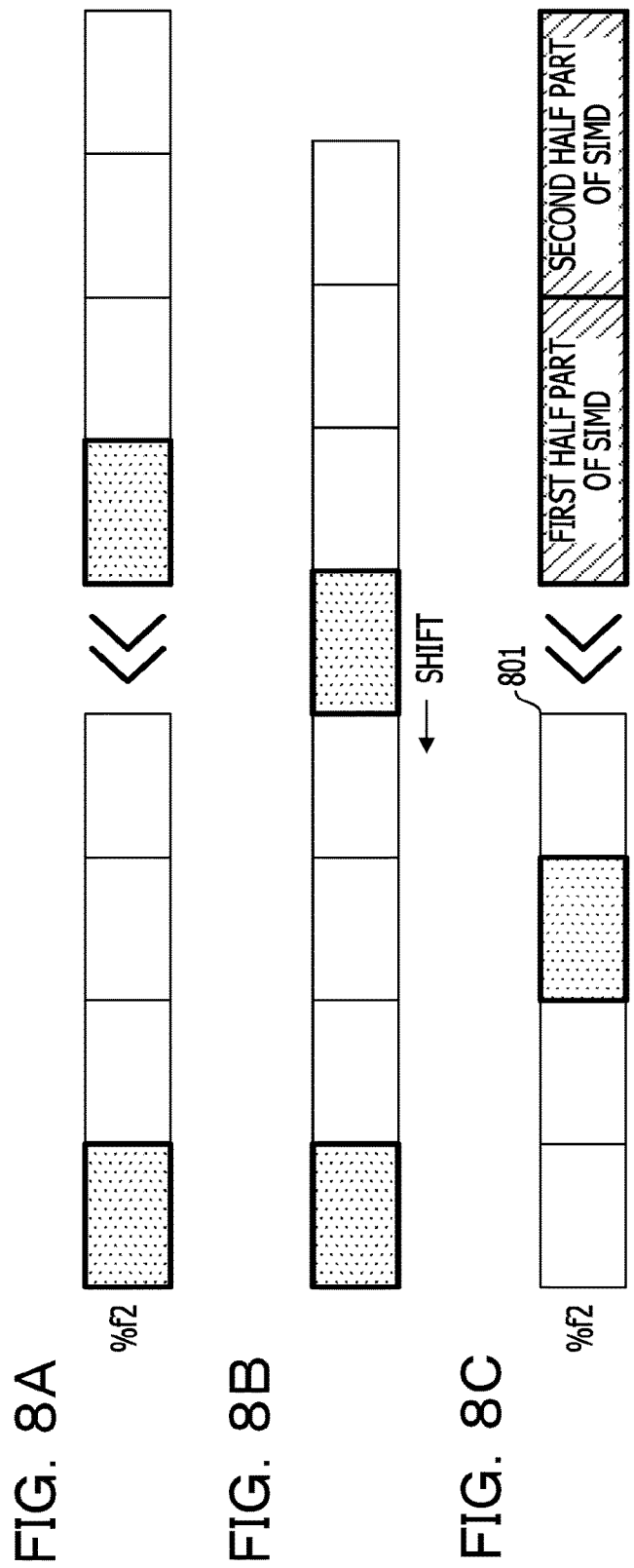
FIGS. 8A to 8C are diagrams for describing a method for storing a first half part of the SIMD data in an empty area of a SIMD register.
Figure 9:
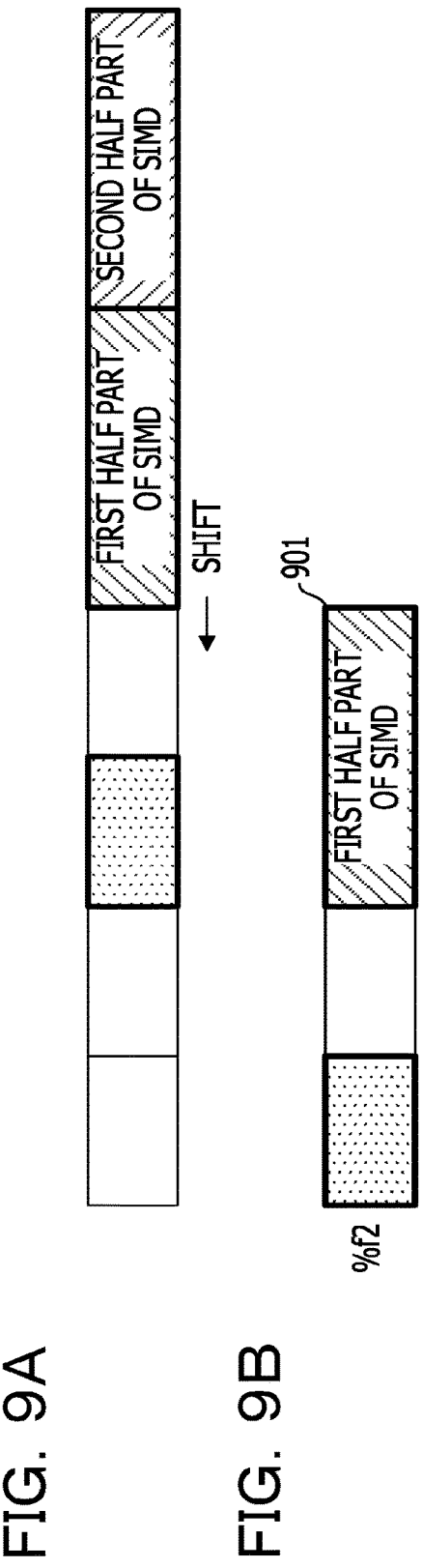
FIGS. 9A and 9B are diagrams for describing the method for storing the first half part of the SIMD data in the empty area of the SIMD register.

As illustrated in FIG. 7, in the embodiment, the SIMD data is divided into the data block of the first half part and the data block of the second half part. As a result, two SIMD registers to be allocated to the SIMD data are prepared.

The first processing unit 1551 determines whether two SIMD registers satisfying the condition exist (step S23). When it is determined that two SIMD registers satisfying the condition do not exist (step S23: No route), since the empty area may not be allocated with respect to the SIMD data to be processed, the process returns to the processing of a call source.

Meanwhile, when it is determined that two SIMD registers satisfying the condition exist (step S23: Yes route), the first processing unit 1551 stores the first half part of the SIMD data to be processed in the empty area of one SIMD register between the two SIMD registers satisfying the condition (step S25).

Herein, by referring to FIGS. 8A to 9B, a method for storing the first half part of the SIMD data to be processed in the empty area of the SIMD register will be described.

In FIG. 8A, in a % f2 register, a figure attached with hatching indicates the scalar data. First, as illustrated in FIG. 8A, the % f2 register is virtually coupled to the % f2 register, and a register having 8 areas illustrated in FIG. 8B is virtually generated. In FIG. 8B, the scalar data of a first area from a left side and the scalar data of a fifth area from the left side are the same as each other. In addition, the data in the register illustrated in FIG. 8B is shifted to a left-side direction by 2 areas. Then, since data of the fifth area from the left side in FIG. 8B moves to a third area at the left side, a % f2 register 801 illustrated in FIG. 8C is generated.

The SIMD data to be processed is virtually coupled to the % f2 register 801, and the register having 8 areas illustrated in FIG. 9A is virtually generated. In addition, the data in the register illustrated in FIG. 9A is shifted to the left-side direction by 2 areas. Then, in FIG. 9A, since data of a third area from the left side moves to a first area from the left side and further, fifth and sixth data from the left side moves to third and fourth areas from the left side respectively, a % f2 register 901 illustrated in FIG. 9B is generated. By such a configuration, the first half part of the SIMD data to be processed is stored in the empty area of the SIMD register.

However, as the method for storing the data in the empty area of the SIMD register, a method other than the methods described by using FIGS. 8A to 9B may be used.

Referring back to FIG. 6, the first processing unit 1551 stores the identification information of the register (the % f2 register in the examples of FIGS. 8A to 9B) allocated to the first half part of the SIMD data to be processed in the first data storing unit 17 (step S27).

The first processing unit 1551 stores a turn ("1" in the embodiment) of the first half part of the SIMD data to be processed in the first data storing unit 17 (step S29).

Figure 10:
FIG. 10 is a diagram for describing storing of a second half part of the SIMD data.

The first processing unit 1551 stores the second half part of the SIMD data to be processed in the empty area of the other SIMD register between the two SIMD registers satisfying the condition (step S31). Since the second half part of the SIMD data to be processed is stored in the empty area of the SIMD register by the method such as the method described by using FIGS. 8A to 9B, detailed description thereof will be omitted. Herein, as illustrated in FIG. 10, it is assumed that the second half part of the SIMD data to be processed is stored in the empty area of a % f4 register.

Accordingly, the SIMD register becomes a state illustrated in FIG. 11 as a whole. In FIG. 11, a part other than the first half part and the second half part of the SIMD data to be processed among parts attached with the hatching corresponds to a part in which the allocation is performed by the register allocation by the first register allocating unit 153. In the embodiment, an area just after the area in which the scalar data is stored just becomes the empty area so as to newly store the scalar data.

The first processing unit 1551 stores the identification information of the register (the % f4 register in the example of FIG. 10) allocated to the second half part of the SIMD data to be processed in the first data storing unit 17 (step S33).

The first processing unit 1551 stores a turn ("2" in the embodiment) of the second half part of the SIMD data to be processed in the first data storing unit 17 (step S35). Then, the process returns to the processing of the call source.

By the above-described processing, for example, data illustrated in FIG. 12A is stored in the first data storing unit 17. In FIG. 12A, "% f2" and "% f4" are stored as the identification information of the register allocated to the SIMD data, and "1" and "2" are stored as the turn. Further, for example, data as illustrated in FIG. 12B is stored in the second data storing unit 18. In FIG. 12B, as the data type of the data which is additionally stored, "Simd" is stored in the entries of the % f2 register and the % f4 register.

Referring back to the description of FIG. 5, when the first optimization processing ends, the process proceeds to a processing of step S19. Meanwhile, when the data type is not the "SIMD" (step S11: No route), the second register allocating unit 155 determines whether the data type is the "scalar" (step S15).

When it is determined that the data type is not the "scalar" (step S15: No route), the process proceeds to the processing of step S19. Meanwhile, when it is determined that the data type is the "scalar" (step S15, Yes route), the second register allocating unit 155 calls the second processing unit 1552 to cause the second processing unit 1552 to execute the second optimization processing (step S17). The second optimization processing will be described by using FIGS. 13 to 15.

Figure 13:
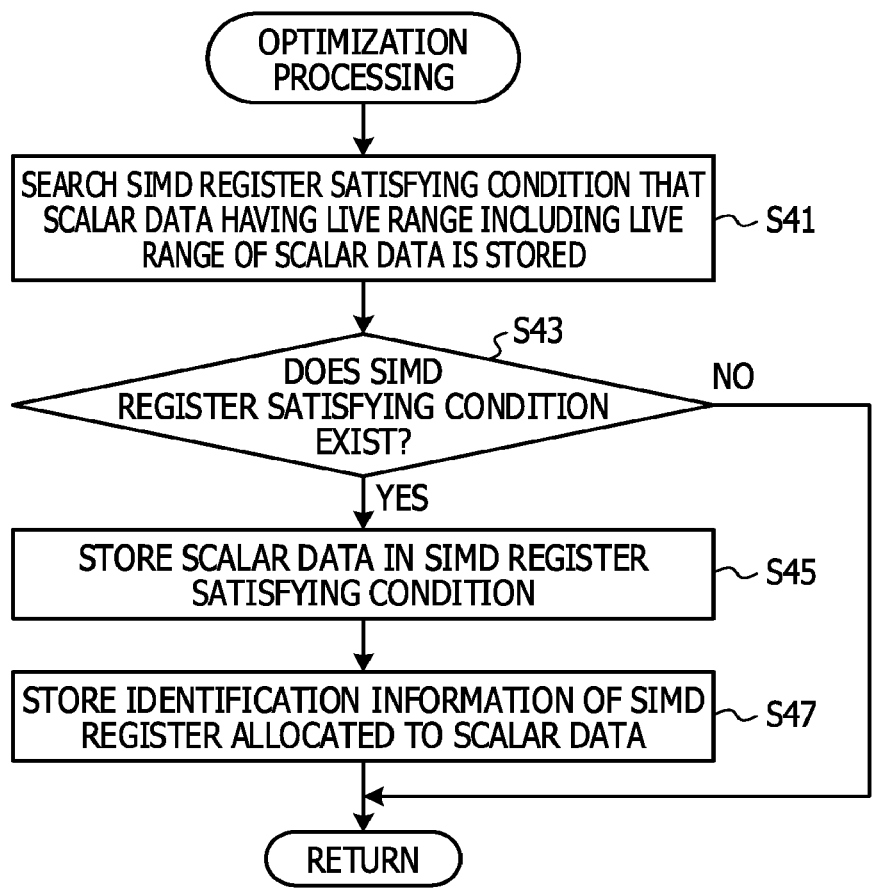
FIG. 13 is a diagram illustrating a processing flow of a second optimization processing.

First, the second processing unit 1552 specifies the live range of the scalar data (hereinafter, called scalar data to be processed) of the entry specified in step S5 from the information on the register overflow. Then, the second processing unit 1552 searches the SIMD register satisfying a condition that the scalar data having the live range including the specific live range is stored in the information on the empty area of the SIMD register (FIG. 13: step S41).

The second processing unit 1552 determines whether the SIMD register satisfying the condition exists (step S43). When it is determined that the SIMD register satisfying the condition does not exist (step S43: No route), since the empty area may not be allocated with respect to the scalar data to be processed, the process returns to the processing of the call source.

Meanwhile, when it is determined that the SIMD register satisfying the condition exists (step S43: Yes route), the second processing unit 1552 stores the scalar data to be processed in the empty area of the SIMD register satisfying the condition (step S45).

Figure 14A:
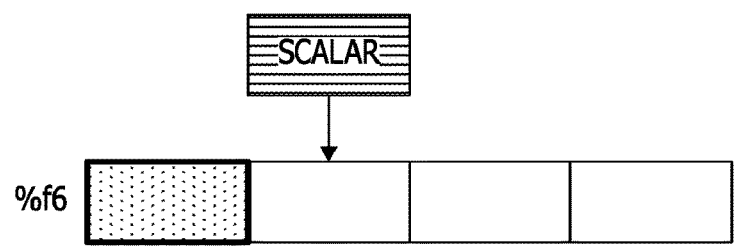
FIGS. 14A and 14B are diagrams for describing a method for storing scalar data in the empty area of the SIMD register.
Figure 14B:

For example, as illustrated in FIG. 14A, considered is a case in which in the state where the scalar data has already been stored in a % f6 register, the scalar data is newly stored in the % f6 register. In this case, as illustrated in FIG. 14B, the scalar data is newly stored in the empty area just after the already stored scalar data. Accordingly, the first half part or the second half part of the SIMD data may be stored in the two remaining areas.

Figure 15:
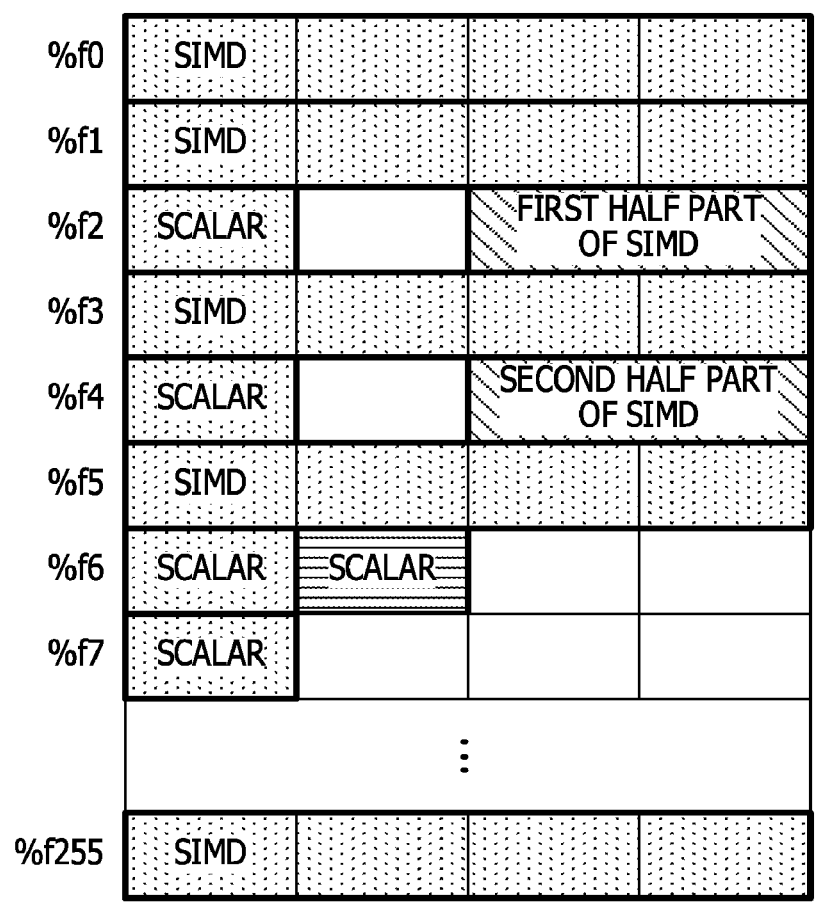
FIG. 15 is a diagram illustrating allocation of the SIMD register for the scalar data.

Accordingly, the SIMD register becomes the state illustrated in FIG. 15 as a whole. In FIG. 15, a part other than the scalar data to be processed among the parts attached with the hatching corresponds to the part in which the allocation is performed by the register allocation by the first register allocating unit 153. In the embodiment, a third area and a fourth area from the left side just become the empty area so as to newly store the SIMD data.

Referring back to the description of FIG. 13, the second processing unit 1552 stores the identification information of the register (the % f6 register in the example of FIG. 14) allocated to the scalar data to be processed in the first data storing unit 17 (step S47). Then, the process returns to the processing of the call source.

By the above-described processing, for example, data illustrated in FIG. 16A is stored in the first data storing unit 17. In FIG. 16A, "% f6" is stored as the identification information of the register allocated to the scalar data. Further, for example, data illustrated in FIG. 16B is stored in the second data storing unit 18. In FIG. 16B, as the data type of the data which is additionally stored, the "scalar" is stored in the entry of the % f6 register.

Referring back to FIG. 5, when the second optimization processing ends, the process proceeds to the processing of step S19. The second register allocating unit 155 determines whether an unprocessed entry exists (step S19). When it is determined that an unprocessed entry exists (step S19, Yes route), the process returns to the processing of step S5. Meanwhile, when it is determined that an unprocessed entry does not exist (step S19, No route), the processing ends.

When the above-described processing is executed, more data are allocated to the register, and as a result, an access from the processor 10 to the memory 11 may be reduced to increase the execution performance of the program.

By using FIGS. 17A to 19B, a method for restoring the original SIMD data from the first half part and the second half part of the SIMD data will be described. Herein, as illustrated in FIG. 11, it is assumed that the % f2 register is allocated to the first half part, and the % f4 register is allocated to the second half part.

First, as illustrated in FIG. 17A, the % f4 register is virtually coupled to the % f2 register, and a register having 8 areas illustrated in FIG. 17B is virtually generated. In addition, the data in the register illustrated in FIG. 17B is shifted to the left-side direction by 2 areas. Then, a % f2 register 1701 illustrated in FIG. 17C is generated.

Figure 18A:
FIGS. 18A to 18C are diagrams for describing the method for restoring the original SIMD data from the first half part and the second half part of the SIMD data.
Figure 18B:
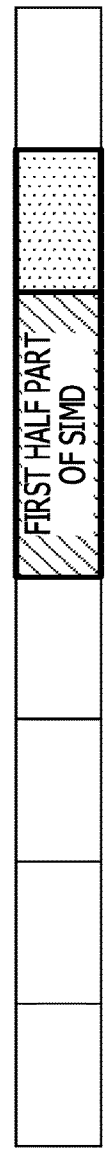
Figure 18C:

Further, as illustrated in FIG. 18A, the % f2 register 1701 is virtually coupled to a definable SIMD register (herein, the SIMD register originally allocated to the SIMD data), and as a result, the register having 8 areas, which is illustrated in FIG. 18B is virtually generated. In addition, the data in the register illustrated in FIG. 18B is shifted to the left-side direction by 2 areas. Then, a definable SIMD register 1801 illustrated in FIG. 18C is generated. Meanwhile, the processing described by using FIGS. 17A to 17C is executed even with respect to the second half part of the SIMD data to generate a % f4 register 1802.

Figures 19A, 19B:
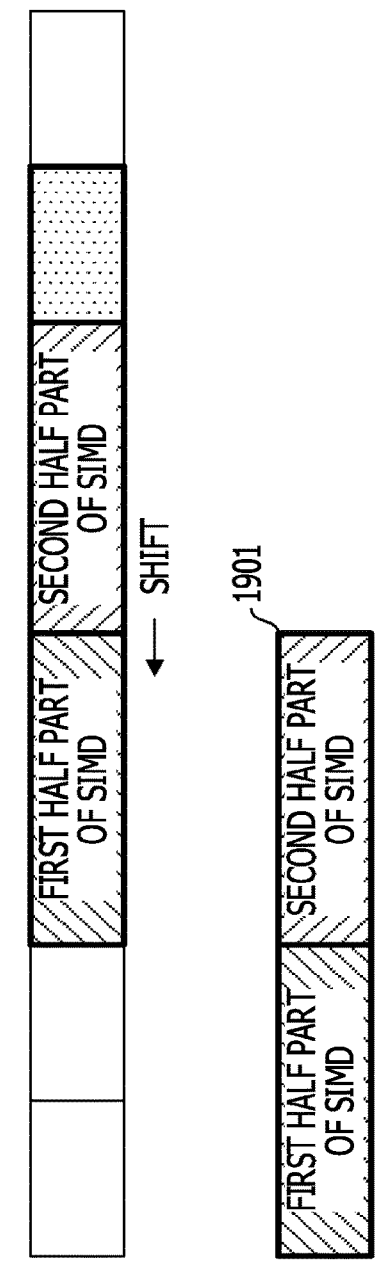
FIGS. 19A and 19B are diagrams for describing the method for restoring the original SIMD data from the first half part and the second half part of the SIMD data.

In addition, the % f4 register 1802 is virtually coupled to the definable SIMD register 1801, and as a result, the register having 8 areas, which is illustrated in FIG. 19A is virtually generated. In addition, the data in the register illustrated in FIG. 19A is shifted to the left-side direction by 2 areas. Then, a definable SIMD register 1901 illustrated in FIG. 19B is generated.

The embodiment of the present disclosure has been described above, but the present disclosure is not limited thereto. For example, the functional block configuration of the information processing device 1 described above may be different from an actual program module configuration.

Further, the configuration of each table described above is merely an example and may not be necessarily required. Further, in the processing flow, the processing turn may be changed as long as the processing result is not changed. Moreover, the processings may be executed in parallel.

Further, the SIMD register in the embodiment has 4 areas, but the number of the areas is not limited. Further, in the above-described example, the number of the data blocks obtained by dividing the SIMD data is 2, but is not limited.

The above-described embodiment of the present disclosure may be summarized as follows.

The information processing device according to a first aspect of the embodiment has (A) a specification unit that specifies a first single instruction multiple data (SIMD) register allocated to scalar data and further, satisfying a condition that a survival interval of the scalar data includes a survival interval of the first data to which any register is not allocated and (B) an allocation unit allocating to the first data the empty area of the first SIMD register specified by the specification unit.

As a result, the SIMD register allocated to the scalar data may be usefully used and occurrence of register overflow may be suppressed to enhance execution performance of the program. Further, the first SIMD register allocated to data in which the survival interval is common to at least a part of the survival interval of the first data may be suppressed from being allocated to the first data.

Further, the above-described allocation unit may (b1) divide the first data into a plurality of data blocks when the first data is SIMD data and (b2) allocate the empty areas of a plurality of respective first SIMD registers specified by the specification unit to any one of a plurality of data blocks. Since the first SIMD register is allocated to the scalar data, there may be a possibility that one first SIMD register will not be able to store the first data. Accordingly, the allocation of the SIMD data may be appropriately performed by performing as described above.

Further, the allocation unit (b3) may allocate to the first data the empty area just after the area in which the scalar data is stored in the first SIMD register when the first data is the scalar data. As a result, the scalar data may be allocated so as to prevent the allocation of the SIMD data from being interrupted.

A compile method according to a second aspect of the embodiment includes (C) specifying a first single instruction multiple data (SIMD) register allocated to scalar data and further, satisfying a condition that a survival interval of the scalar data includes the survival interval of the first data to which any register is not allocated and (D) allocating to the first data the empty area of the specified first SIMD register.

A program for allowing the processor to perform the processing by the above-described method may be prepared and the program is stored in computer readable storage media or storage devices including, for example, a flexible disk, a CD-ROM, a magneto-optic disk, a semiconductor memory, a hard disk, and the like. Further, an intermediate processing result is temporarily kept in memory devices including a main memory, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory that stores a program for compiling a source code; and
   a processor that executes the program to perform a compile operation,
   wherein the compile operation includes:
      storing information on variable data resulted from a register overflow and on an empty area of each register in the memory based on a result of a register allocation process;
      determining whether the register overflow occurs in the register allocation process by reading the information on the variable data resulted from the register overflow stored in the memory at the storing;
      when the register overflow occurs in the register allocation process, retrieving the information on the empty area of each register from the memory, and specifying a register which is allocated to scalar data in the register allocation process and satisfies a condition that a live range of the scalar data allocated to the register specified at the specifying includes a live range of the variable data for which any register is not allocated in the register allocation process due to the register overflow;
      allocating the empty area of the register specified at the specifying to the variable data; and
      updating the information on the variable data resulted from the register overflow and on the empty area of each register in the memory based on a result from the allocating.

2. The information processing device according to claim 1, wherein the processor divides the variable data into a plurality of data blocks when the variable data is single instruction multiple data (SIMD), and allocates respective empty areas of a plurality of registers specified by the processor to any one of the plurality of data blocks.

3. The information processing device according to claim 1, wherein, when the variable data is the scalar data, the processor allocates the empty area positioned just after an area in which the scalar data is stored in the register specified at the specifying to the variable data.

4. A non-transitory computer-readable recording medium storing a compile program that causes a computer to execute a process comprising:
   storing information on variable data resulted from a register overflow and on an empty area of each register in a memory based on a result of a register allocation process;
   determining whether the register overflow occurs in the register allocation process by reading the information on the variable data resulted from the register overflow stored in the memory at the storing;
   when the register overflow occurs in the register allocation process, retrieving the information on the empty area of each register from the memory, and specifying a register which is allocated to scalar data in the register allocation process and satisfies a condition that a live range of the scalar data allocated to the register specified at the specifying includes a live range of variable data for which any register is not allocated in the register allocation process due to the register overflow;
   allocating the empty area of the register specified at the specifying to the variable data; and
   updating the information on the variable data resulted from the register overflow and on the empty area of each register in the memory based on a result from the allocating.

5. The non-transitory computer-readable recording medium according to claim 4, wherein the process includes:
   dividing the variable data into a plurality of data blocks when the variable data is single instruction multiple data (SIMD); and
   allocating respective empty areas of a plurality of registers specified by the processor to any one of the plurality of data blocks.

6. The non-transitory computer-readable recording medium according to claim 4, wherein the process includes:
   allocating, when the variable data is the scalar data, the empty area positioned just after an area in which the scalar data is stored in the register specified at the specifying to the variable data.

7. A compile method comprising:
   storing information on variable data resulted from a register overflow and on an empty area of each register in a memory based on a result of a register allocation process;
   determining whether the register overflow occurs in the register allocation process by reading the information on the variable data resulted from the register overflow stored in the memory at the storing;
   when the register overflow occurs in the register allocation process, retrieving the information on the empty area of each register from the memory, and specifying, by a computer, a register which is allocated to scalar data in the register allocation process and satisfies a condition that a live range of the scalar data allocated to the register specified at the specifying includes a live range of the variable data for which any register is not allocated in the register allocation process due to the register overflow;

allocating the empty area of the register specified at the specifying to the variable data; and updating the information on the variable data resulted from the register overflow and on the empty area of each register in the memory based on a result from the allocating.

8. The compile method according to claim 7, further comprising:

dividing the variable data into a plurality of data blocks when the variable data is single instruction multiple data (SIMD); and allocating respective empty areas of a plurality of registers specified by the processor to any one of the plurality of data blocks.

9. The compile method according to claim 7, further comprising: allocating, when the variable data is the scalar data, the empty area positioned just after an area in which the scalar data is stored in the register specified at the specifying to the variable data.

* * * * *